No. 890,390. PATENTED JUNE 9, 1908.
G. F. ZINN.
BAKER'S TOOL.
APPLICATION FILED JULY 30, 1907.
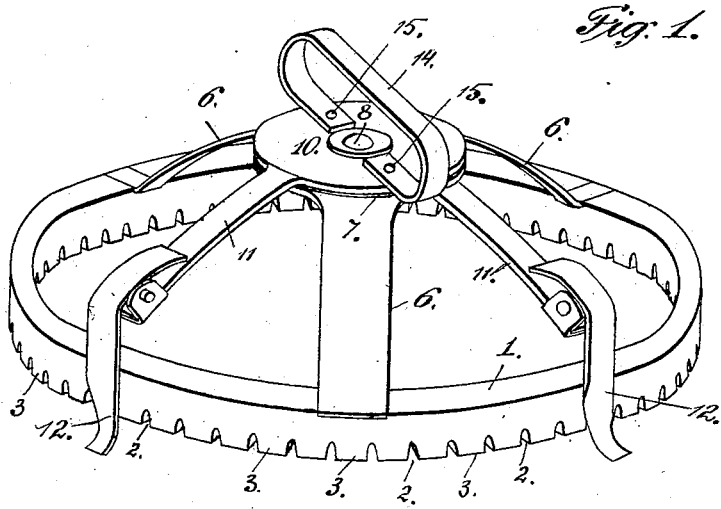
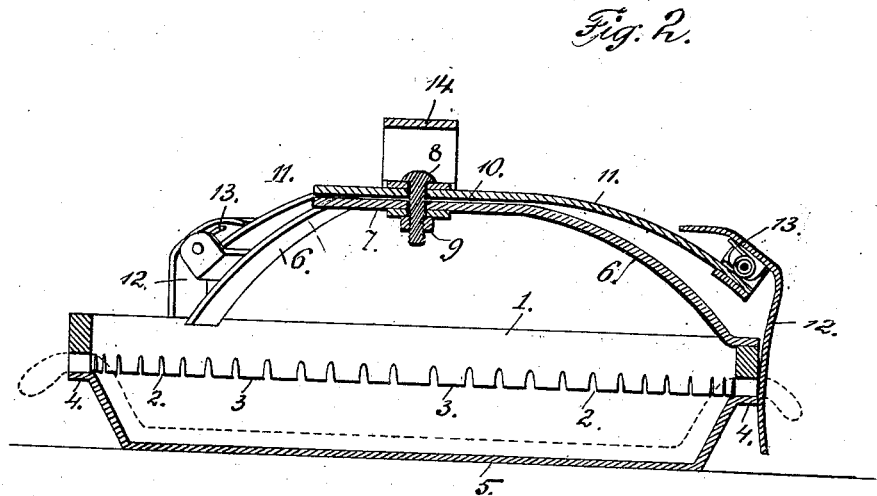
Witnesses
Inventor
G. F. Zinn,
By
Attorneys
THE NORRIS PETERS CO., WASHINGTON, D. C.

UNITED STATES PATENT OFFICE.

GEORGE F. ZINN, OF DERRY, PENNSYLVANIA.

BAKER'S TOOL.

No. 890,390.  Specification of Letters Patent.  Patented June 9, 1908.

Application filed July 30, 1907. Serial No. 386,202.

*To all whom it may concern:*

Be it known that I, GEORGE F. ZINN, a citizen of the United States of America, residing at Derry, in the county of Westmoreland and State of Pennsylvania, have invented certain new and useful Improvements in Bakers' Tools, of which the following is a specification, reference being had therein to the accompanying drawing.

This invention relates to bakers' tools, and more particularly to a device for use in making pies.

The primary object of the invention is, to provide novel means for indenting the upper edge of the pie crust before it is baked, and a further object is to combine with the indenting device a rotating frame provided with depending cutters to remove the surplus dough projecting over the edge of the pan.

The construction of the improvement will be fully described hereinafter in connection with the accompanying drawing which forms part of this specification, and its novel features will be defined in the appended claims.

In the drawing:—Figure 1 is a view in perspective of the invention, and, Fig. 2 is a vertical section of the same applied to a pie-pan.

Referring to the drawings 1 designates an annular crimping member preferably constructed of metal formed on its lower edge with a series of equi-distant notches 2, thereby providing a series of projections 3. The member 1 is of a diameter as to correspond to the peripheral edge 4 of an ordinary pie pan and projecting inwardly from the upper edge of the member 1 is a plurality of arms 6 spaced equi-distant apart and connected at their upper ends to a centrally-disposed supporting disk 7.

Extending centrally through the disk 7 is a pivot screw 8 which carries on its lower end a nut 9. The pivot screw 8 is adapted to connect to the disk 7 a rotatable disk 10, the screw 8 extending through the disk 10. From the latter projects a plurality of arms 11, each of which carries at its outer end a depending cutting arm 12. Each of the arms 12 is pivotally-connected to an arm 11 and is of such length as to overlap the edge of the pan 5 as clearly shown in Fig. 2. The cutting arms 12 are normally maintained against the pan 5 by springs 13, these latter bearing against the upper end of the cutting arms 12 as clearly shown in Fig. 2. A loop-handle 14 is secured to the disk 10 by rivets 15.

The utility and operation of the device constructed as thus described will be readily understood.

By pressing the ring 1 down upon the dough resting on the outer flange 4 of the pan, the ornamental indentations, ordinarily made by the use of the tines of a fork, are formed in the dough after which the disk 10 is turned by the handle 14 revolving the cutters 12 to remove the surplus dough.

Having fully described my invention what I claim and desire to secure by Letters Patent is, 1. A pie baker's tool embodying a crimping member, and a rotatable cutting device carried by the crimping member and embodying a plurality of spring-pressed cutting arms adapted to over-lap the edge of and normally maintained against the pie pan.

2. A pie baker's tool embodying an annular crimping member, a supporting disk carried thereby, and a rotatable cutting device mounted upon said disk and embodying a plurality of spring-pressed cutting arms of a length as to overlap the edge of and normally maintained against the pie pan.

3. A pie-baker's tool comprising a ring indented on its under surface and connected by radial arms to a central disk, and a cutter consisting of a frame pivotally attached to said central disk, and depending cutters overlapping the outer edge of said ring.

4. A pie-baker's tool comprising a ring indented on its under surface, and connected by radial arms to a central disk, and a cutter consisting of a frame pivotally attached to said central disk and depending cutting arms overlapping the outer edge of said ring, said cutting arms having spring connections with the said frame.

In testimony whereof I affix my signature in the presence of two witnesses.

GEORGE F. ZINN.

Witnesses:
J. F. AMEND,
GUY A. GREENE.